May 11, 1926.
L. G. GULDE
LIGHT DIMMER
Filed July 13, 1925
1,584,286
2 Sheets-Sheet 1
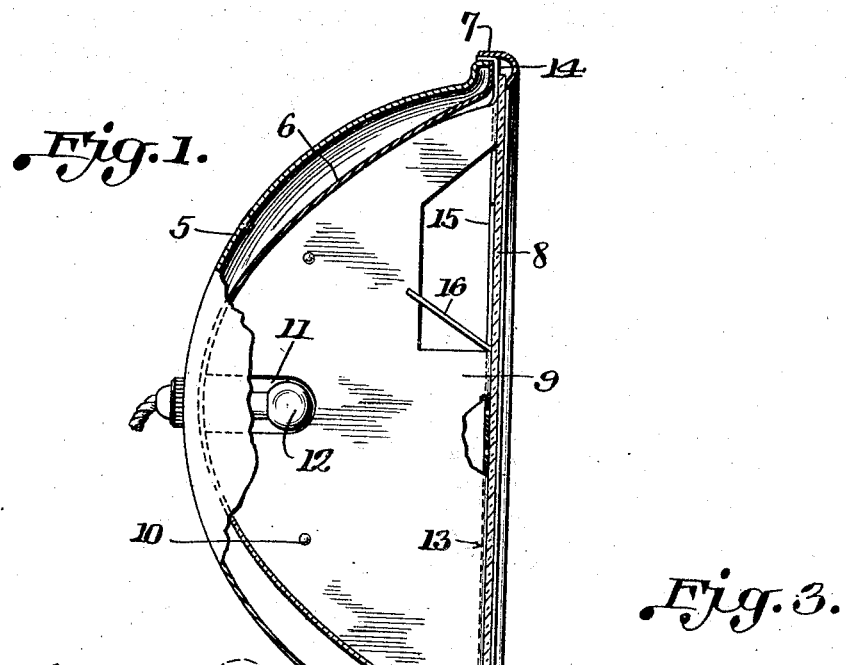
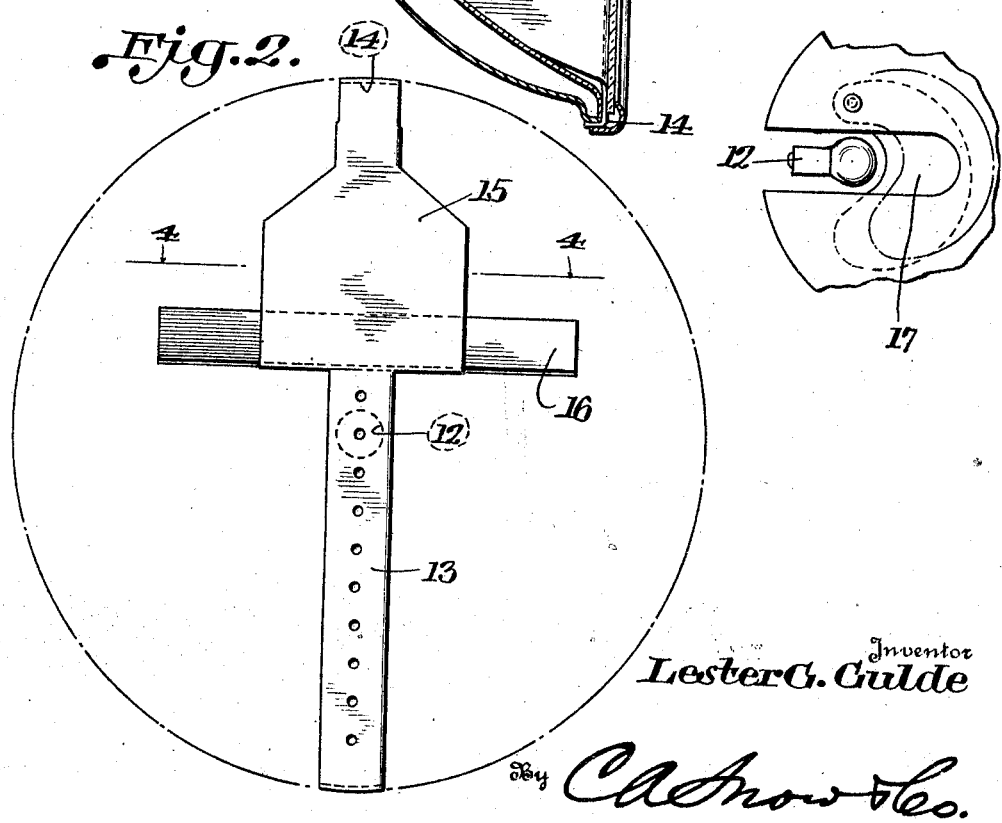
Inventor
Lester G. Gulde
By C. A. Snow & Co.
Attorneys May 11, 1926. 1,584,286
L. G. GULDE
LIGHT DIMMER
Filed July 13, 1925  2 Sheets-Sheet 2
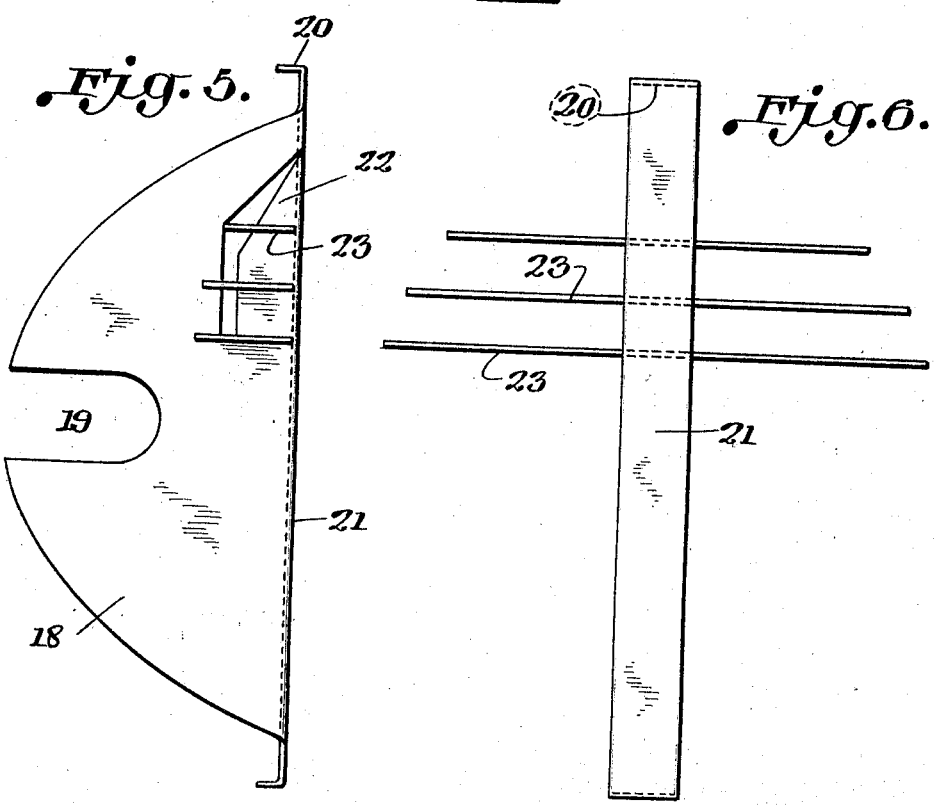

Patented May 11, 1926.

1,584,286

UNITED STATES PATENT OFFICE.

LESTER G. GULDE, OF MINNEAPOLIS, MINNESOTA.

LIGHT DIMMER.

Application filed July 13, 1925. Serial No. 43,260.

This invention relates to headlight dimmers and aims to provide novel means which may be readily and easily positioned within the usual headlight for deflecting the light rays from the lamp positioned therein, eliminating glare.

Another important object of the invention is the provision of means for deflecting light rays downwardly below the line of vision of the operators of approaching machines.

A still further object is to provide an adjustable member adapted to be moved with respect to the lamp or bulb of the headlight, to regulate the light rays passing from the bulb.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through a headlight supplied with a deflector or shield constructed in accordance with the invention.

Figure 2 is a front elevational view thereof.

Figure 3 is a fragmental detail view illustrating the adjustable lamp engaging member.

Figure 4 is a sectional view taken on line 4—4 of Figure 2.

Figure 5 is a side elevational view of a modified form of the invention.

Figure 6 is a front elevational view thereof.

Referring to the drawings in detail, the reference character 5 indicates a headlight casing which is of the usual construction, the same being supplied with the usual curved reflector 6 and lens securing ring 7 which holds the lens 8 in position on the headlight casing.

The device forming the essence of the invention includes a body portion 9 which is circular in formation, the same being constructed of suitable flexible sheet metal so that the same may be bent intermediate its side edges, the side members formed by the bending of the body portion, being riveted together adjacent to the rear edge thereof, by means of rivets 10, while the forward portion of the side members are spaced apart forming a shield for the direct light rays of the lamp.

The curved rear edge of the body portion is adapted to fit within the curved reflector 6 in a manner as shown by Figure 1 of the drawing and the body portion is provided with a cut out portion indicated at 11 to accommodate the lamp 12.

A forward bracing section 13 is formed by bending the body portion and is adapted to brace the forward portion of the body. At the upper and lower ends of the bracing section 13 are tabs 14 that are adapted to fit between the casing 5 and ring section 7 as shown by Figure 1 of the drawings, thereby securely holding the device in position.

The device is cut away at a point adjacent to the bracing section 13, thereby providing the guard plate 15 adapted to act as a shield at the upper portion of the lamp and cause the light rays directed thereagainst to be directed rearwardly to the main reflector 6.

Supported within the cut out portion formed in the body of the guard, is a transversely extending deflecting member 16 which is supported at an oblique angle with respect to the lens 8 of the headlight to the end that the light rays directed to the deflecting member 16 will be directed downwardly to prevent glaring at the upper portion of a headlight.

Pivotally supported between the side members of the body portion of the device is a curved guarding member 17 that is adapted to be moved towards or away from the lamp or bulb which in the present form shown is indicated at 12.

In the form of the invention as illustrated by Figures 5 and 6, the device includes a circular body portion formed preferably of sheet metal, the same being bent intermediate its side edges to provide side members 18 that are cut away at 19 to provide a clearance for the lamp when the device is positioned within a headlight.

Inwardly extended flanges 20 are formed at the upper and lower ends of the central portion of the body which is indicated at 21, so that the device may be readily and easily secured within a headlight. In this form of the invention, a cut out portion is provided, defining inwardly extended spaced flanges 22, which are formed with suitable slots to accommodate the metal deflecting plates 23 which vary in length, and are supported in suitable spaced relation with each other to permit light rays to pass therebetween.

From the foregoing it will be obvious that due to this construction the light rays from the head lamp of a motor vehicle may be confined to the lower portion of the headlight, eliminating the usual objectionable glare, at the upper portion of the headlight.

I claim:—

1. In a device of the character described, a circular body portion, said body portion being bent intermediate its ends to provide a rear curved edge, said body portion having a cut out portion to receive the lamp of the headlight, said body portion having an upper portion cut out to form an upper guard plate, and a transversely extended deflecting member positioned in the last mentioned cut out portion for deflecting light rays downwardly.

2. In a device of the character described, a body portion including a circular member bent intermediate its ends and having its contacting portions secured together, said body portion adapted to be fitted in a headlight casing and having a cut out portion to accommodate the lamp of the headlight, and deflecting means carried by the body portion for deflecting light rays rearwardly and downwardly.

3. In a device of the character described, a circular body portion bent intermediate its side edges to provide lateral members, said lateral members being secured together adjacent to the rear edge thereof, and said lateral members being held in spaced relation at a point adjacent to the forward edge thereof, the forward edge of the body portion having openings, and means carried by the body portion for deflecting light rays downwardly and rearwardly.

4. In a device of the character described, a disk-like body portion bent intermediate its side edges to provide a rear curved surface adapted to be fitted in a headlight casing, said body portion having a cut out portion to accommodate the lamp of the headlight, said body portion having a forward cut out portion, spaced deflecting plates carried by the body portion and arranged within the last mentioned cut out portion for directing light rays downwardly and rearwardly.

5. In a device of the character described, a body portion adapted to be fitted in a headlight casing, to divide the headlight casing into lateral spaces, said body portion having a cut out portion to accommodate the lamp of the headlight, and adjustable means within the last mentioned cut out portion and cooperating with the lamp of the headlight to deflect light rays.

In testimony that I claim the foregoing as my own, I have hereto affixed my signature.

LESTER G. GULDE.